United States Patent
Lee

(10) Patent No.: US 7,379,806 B2
(45) Date of Patent: May 27, 2008

(54) METHOD OF CONTROLLING TRAVEL OF CONSTRUCTION HEAVY EQUIPMENT WITH ELECTRONIC JOYSTICKS

(75) Inventor: Jeong Kyu Lee, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 750 days.

(21) Appl. No.: 10/989,184

(22) Filed: Nov. 15, 2004

(65) Prior Publication Data

US 2005/0209759 A1 Sep. 22, 2005

(30) Foreign Application Priority Data

Mar. 22, 2004 (KR) ............... 10-2004-0019259

(51) Int. Cl.
*G06F 19/00* (2006.01)
(52) U.S. Cl. .................. 701/50; 701/1; 37/414
(58) Field of Classification Search .............. 701/50, 701/1; 37/414
See application file for complete search history.

(56) References Cited

U.S. PATENT DOCUMENTS

| 5,529,134 A * | 6/1996 | Yomogita .............. 180/6.2 |
| 5,611,405 A | 3/1997 | Ishino et al. |
| 5,630,317 A | 5/1997 | Takamura et al. |
| 2002/0046895 A1 | 4/2002 | Kaneda et al. |

FOREIGN PATENT DOCUMENTS

| EP | 0 480 036 | 4/1992 |
| JP | 7-119710 | 5/1995 |
| JP | 11-324026 | 11/1999 |
| JP | 2000-27238 | 1/2000 |

OTHER PUBLICATIONS

Patent Abstracts of Japan of JP 2000-27238 dated Jan. 25, 2000.
Patent Abstracts of Japan of JP 11-324026 dated Nov. 26, 1999.
Patent Abstracts of Japan of JP 7-119710 dated May 9, 1995.

* cited by examiner

*Primary Examiner*—Khoi H. Tran
*Assistant Examiner*—Marie A Weiskopf
(74) *Attorney, Agent, or Firm*—Ladas and Parry LLP

(57) ABSTRACT

Disclosed is a method for controlling travel of construction heavy equipment with electronic joysticks. The method includes the steps of; inputting a joystick travel function selection signal, first manipulation signals of the joysticks and second manipulation signals of acceleration pedals into a controller; determining whether a joystick travel function is selected or released; when the joystick travel function is selected, performing long-distance travel; and when the joystick travel function is released, performing a work. The working unit such as the boom and the arm and the traveling unit can be selectively driven by using the electronic joystick. Thus, the driver can control the travel of the construction heavy equipment in a comfort sitting posture.

3 Claims, 3 Drawing Sheets

METHOD OF CONTROLLING TRAVEL OF CONSTRUCTION HEAVY EQUIPMENT WITH ELECTRONIC JOYSTICKS

CROSS-REFERENCE TO RELATED APPLICATIONS

This application claims benefit under 35 U.S.C. § 119 from Korean Patent Application No. 2004-19259, filed on Mar. 22, 2004, the entire content of which is incorporated herein by reference.

BACKGROUND OF THE INVENTION

1. Field of the Invention

The present invention generally relates to a method of controlling travel of construction heavy equipment with electronic joysticks, with which a driver can control the travel of the construction heavy equipment in a comfort sitting posture.

The present invention specifically relates to a method of controlling travel of construction heavy equipment with electronic joysticks, capable of selectively driving a working unit and a traveling unit by using the electronic joysticks for the working unit such as a boom, an arm or so forth.

2. Description of the Related Art

In general, construction heavy equipment such as an excavator makes use of an acceleration pedal or a travel lever connected with the acceleration pedal which is for performing travel operation, and a manipulation lever, such as a joystick, for a working unit such as a boom, an arm, a bucket, a swing unit or so forth.

Currently, an electronic joystick is widely used as the manipulation lever, wherein the joystick outputs a signal in proportion to a quantity of manipulation caused by a driver or operator. The signal outputted from the joystick may be an analog voltage signal, a PWM (Pulse Width Modulation) signal, a communication signal, etc.

Various working units including the swing unit and the traveling unit are driven by a hydraulic fluid supplied from a hydraulic pump operated by an engine. A control unit controls a direction and a flow rate of a hydraulic fluid supplied to the working units by controlling various control valves according to the manipulation quantity of the manipulation lever, so that the working units and the traveling unit are driven.

In order to make the heavy equipment travel, the driver has either to press the acceleration pedal with his/her foot or to manipulate the travel lever connected with the acceleration pedal with his/her hand. When the driver manipulates the joystick for the working unit, he/she can work in a state where he/she assumes a comfortable posture on the driver's seat. However, when the travel lever installed a little apart in front of the driver's seat is manipulated, the driver must manipulate the travel lever in a state where he/she leans forward in the driver's seat to a certain degree.

During long-distance traveling, the driver must step on the acceleration pedal under continuous application of a constant force. For this reason, the travel lever is used instead of the acceleration pedal. In this case, the driver must lean forward in the driver's seat for a long time. Thus, the driver easily feels tired.

According to a prior art for overcoming these drawbacks, a manipulation lever for a traveling unit has been installed around a joystick for a working unit. With this configuration, the manipulation lever must be installed separately from a hydraulic line, so that the configuration becomes complicated and production costs are increased.

According to another prior art, a control valve has been installed on a pilot signal line connected to a joystick of a working unit. When the control valve is switched, a pilot signal pressure of the joystick being supplied to the working unit is adapted to be supplied to a traveling unit, so that any one of the working unit and the traveling unit is selectively driven by using the joystick.

However, according to these prior arts, a configuration of a hydraulic circuit becomes complicated, and thereby production costs are increased. Further, there is a limitation that this configuration can not be applied to the state-of-the-art heavy equipment where all the units of the heavy equipment are controlled by electrical and electronic signals from an electronic proportional valve etc.

SUMMARY OF THE INVENTION

Therefore, it is an object of the present invention to provide a method of controlling travel of construction heavy equipment, by which a driver can control the travel of the construction heavy equipment in a comfort sitting posture.

It is another object to selectively drive a working unit and a traveling unit using electronic joysticks for the working unit such as a boom, an arm or so forth.

In order to accomplish these object, the present invention provides a method for controlling travel of construction heavy equipment with joysticks, in which the construction heavy equipment has boom and arm joysticks outputting first manipulation signals according to quantities of manipulation in order to drive a boom and an arm, left and right acceleration pedals outputting second manipulation signals according to quantities of manipulation in order to drive left and right traveling units, a plurality of control valves controlling hydraulic fluid supplied to each of the boom, the arm and the left and right traveling units, and a plurality of electronic proportional valves operated by control signals outputted from a controller to control each of the control valves. The method comprises the steps of: inputting a joystick travel function selection signal, the first manipulation signals generated by the joysticks and the second manipulation signals generated by the acceleration pedals into the controller; determining whether a joystick travel function is selected or released from the joystick travel function selection signal; when the joystick travel function is selected, performing long-distance travel by preventing the control signal according to the second manipulation signals of the acceleration pedals from being outputted, by outputting the control signal according to the first manipulation signal of the arm joystick to the electronic proportional valves connected to the control valve for controlling the left traveling motor and by outputting the control signal according to the first manipulation signal of the boom joystick to the electronic proportional valves connected to the control valve for controlling the right traveling motor; and when the joystick travel function is released, performing a work by outputting the control signal according to the first manipulation signal of the arm joystick to the electronic proportional valves connected to the control valve for controlling an arm cylinder, by outputting the control signal according to the first manipulation signal of the boom joystick to the electronic proportional valves connected to the control valve for controlling an boom cylinder and by outputting the control signal according to the second manipulation signals of the acceleration pedals to the electronic proportional valves for the traveling motors.

Here, preferably, the construction heavy equipment is provided with a display device for displaying information of the construction heavy equipment to a driver, and the method further comprises the steps of; when the joystick travel function is selected, displaying a state of the selected travel function and a warning message on the display device; and when the joystick travel function is released, releasing the state of the selected travel function and the warning message from the display device.

Preferably, in the step of performing the long-distance travel, a secondary pressure characteristic of the electronic proportional valves based on the manipulation quantities of the joysticks is controlled in a parabolic form in order to improve precise manipulation capability of the joysticks and to prevent impact from being generated on travel starting of the construction heavy equipment.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, a configuration and operation of an industrial vehicle according to the present invention will be described in more detail through exemplary embodiments of accompanying drawings.

Figure 2:
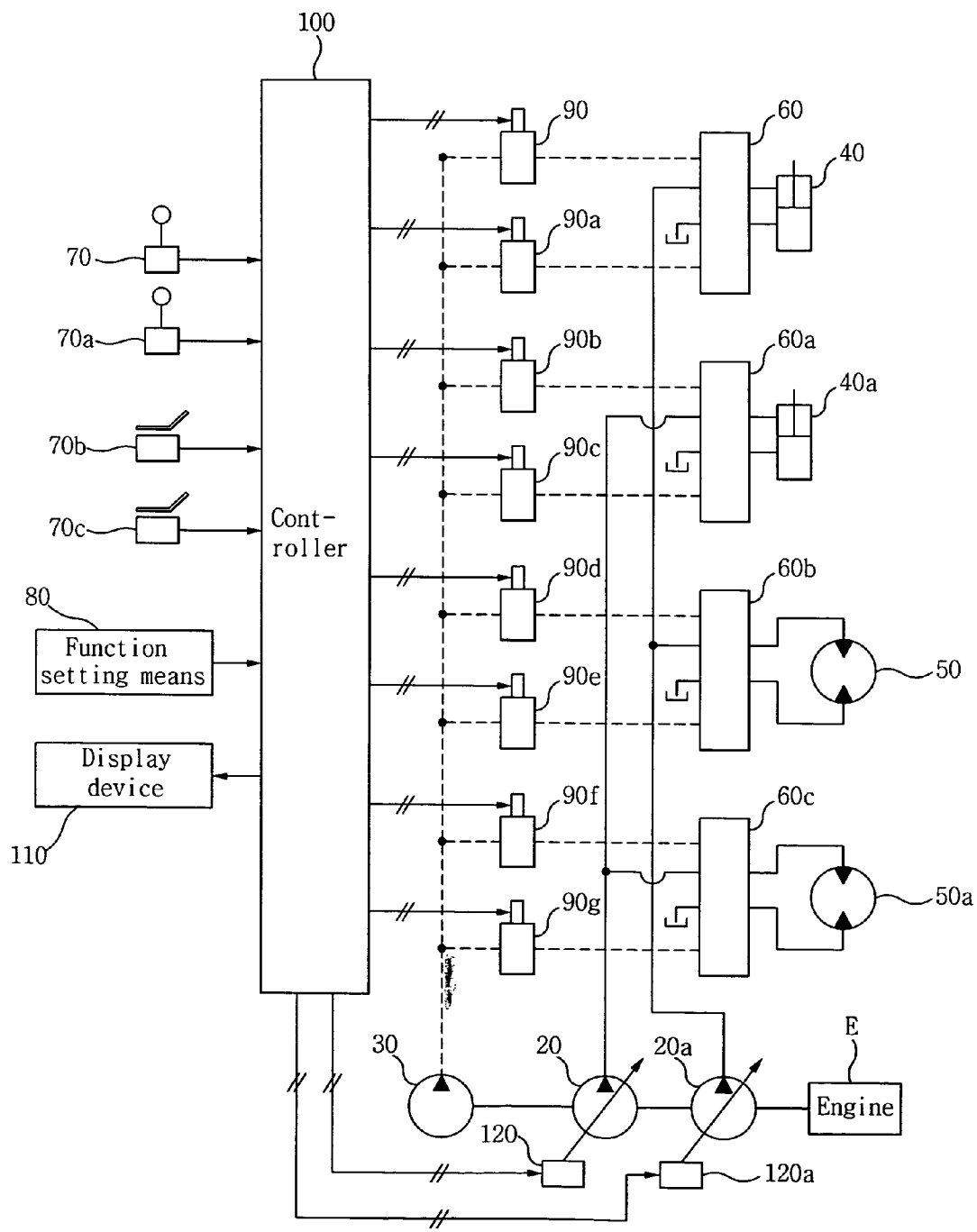
FIG. 2 is a hydraulic circuit diagram of a system used in a method for controlling travel of construction heavy equipment with electronic joysticks in accordance with the present invention.

As shown in FIG. 2, heavy equipment is provided with hydraulic pumps 20 and 20a and a pilot pump 30 which are driven by an engine E.

On the heavy equipment, working units such as a boom and an arm are mounted. The boom (not shown) is driven by a boom cylinder 40. The arm (not shown) is driven by an arm cylinder 40a. A driver manipulates a boom joystick 70 and an arm joystick 70a to move the boom and the arm, so that a desired work can be performed.

Further, the heavy equipment is provided with left and right traveling motors 50 and 50a as left and right traveling units. When the driver manipulates acceleration pedals 70b and 70c, the left and right traveling motors 50 and 50a are driven. Thereby, the travel of the heavy equipment is performed.

Control valves 60, 60a, 60b and 60c respectively supply hydraulic fluid discharged from the hydraulic pumps 20 and 20a to the boom cylinder 40, the arm cylinder 40a, and the left and right traveling motors 50 and 50a. The control valves 60, 60a, 60b and 60c are operated by electronic proportional valves 90 and 90a to 90g, thus controlling flow direction and rate of the hydraulic fluid of the hydraulic pumps 20 and 20a. Thereby, the boom cylinder 40, the arm cylinder 40a, and the left and right traveling motors 50 and 50a are controlled by the control valves.

The electronic proportional valves 90 and 90a to 90g are connected to the pilot pump 30, and supply a pilot signal pressure from the pilot pump 30 to the control valves 60, 60a, 60b and 60c, thereby operating the control valves. Further, the electronic proportional valves 90 and 90a to 90g are connected to a controller 100. When control signals are inputted from the controller 100, the electronic proportional valves are operated.

The controller 100 receives manipulation signals generated according to a quantity of manipulation of the joysticks 70 and 70a and the acceleration pedals 70b and 70c, thereby outputting control signals to the respective electronic proportional valves 90 and 90a to 90g.

Among reference numbers in the figures, 120 and 120a refer to pump flow rate controlling means for a pump discharge flow rate by controlling displacement of the hydraulic pumps 20 and 20a with the control signals inputted from the controller 100, and 110 refers to a display device for displaying various information of the heavy equipment to the driver.

Hereinafter, an example of using a method for controlling travel of heavy equipment with a joystick in accordance with the present invention will be described in detail with reference to the attached drawings.

Figure 1:
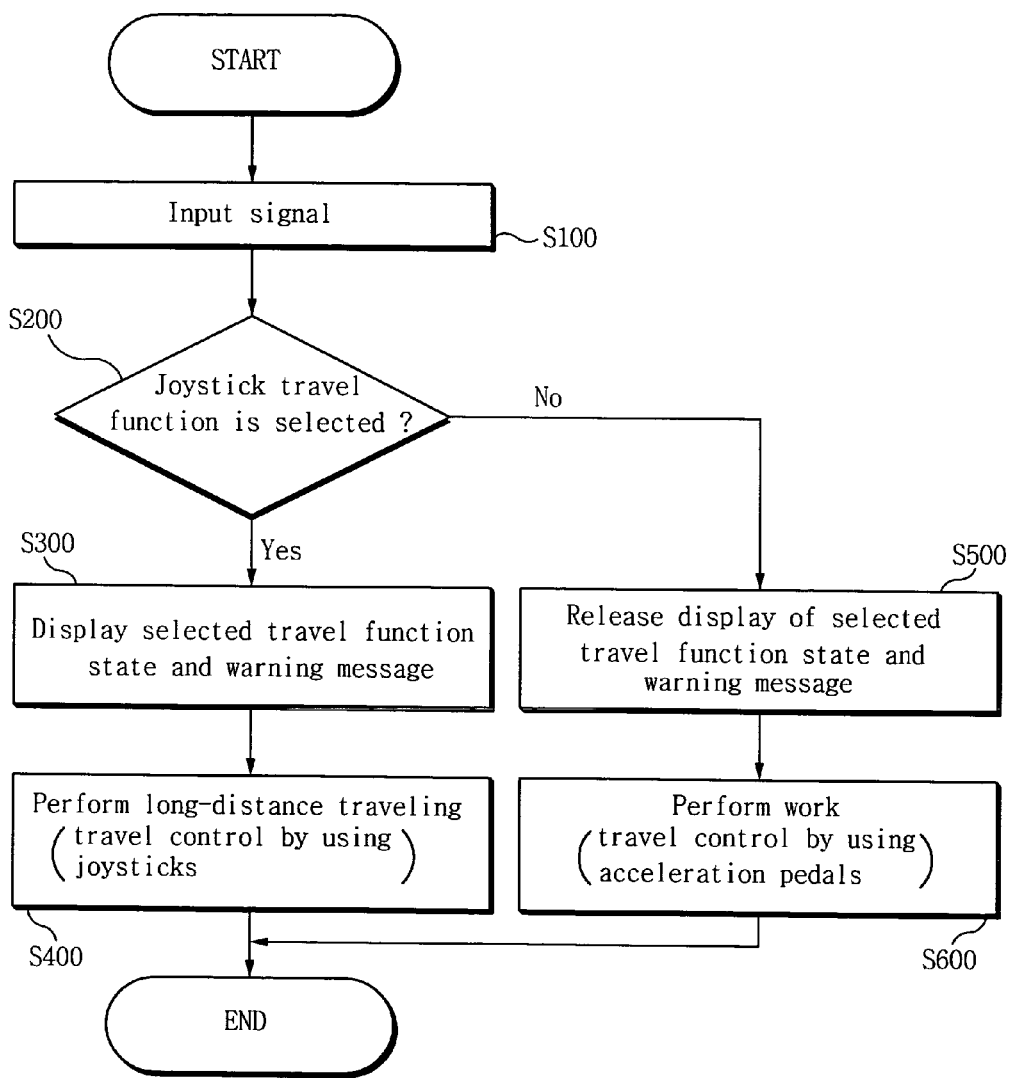
FIG. 1 is a flow chart showing a method for controlling travel of construction heavy equipment with electronic joysticks in accordance with the present invention.

A method for controlling travel of heavy equipment with a joystick in accordance with the present invention comprises a signal inputting step S100, a function selection determining step S200, a travel function displaying step S300, a long-distance traveling step S400, a display releasing step S500, and a work performing step S600, as shown in FIG. 1.

In the signal inputting step S100, two kinds of signals, namely a joystick travel function selection signal (signal of selecting a function of allowing travel to be controlled by joysticks 70 and 70a) and manipulation signals for controlling a working unit such as a boom and an arm through the joysticks 70 and 70a and for controlling travel through acceleration pedals 70b and 70c, are inputted into a controller 100.

The joystick travel function selection signal is generated by a function setting means 80. As the function setting means 80, a communication apparatus or on/off switch (not shown) may be used.

In the function selection determining step S200, the controller 100 determines whether a joystick travel function is selected or released.

As a result of determination in the foregoing function selection determining step S200, when the joystick travel function is selected, the travel function displaying step S300 and the long-distance traveling step S400 are sequentially performed.

In the travel function displaying step S300, the controller 100 displays a state where the joystick travel function is selected and a warning message on a display device 110, thereby informing driver that the joystick travel function is running.

In the long-distance traveling step S400, the driver can manipulate the arm joystick 70a to drive a left traveling motor 50, and can manipulate the boom joystick 70 to drive a right traveling motor 50a. Therefore, at this time, the driver manipulates the joysticks 70 and 70a instead of the acceleration pedals 70b and 70c to control the travel of the heavy equipment.

In the long-distance traveling step S400, the controller 100 outputs a manipulation signal according to a quantity of manipulation of the arm joystick 70a to electronic proportional valves 90d and 90e for the left traveling motor, and outputs a manipulation signal according to a quantity of manipulation of the boom joystick 70 to electronic proportional valves 90f and 90g for the right traveling motor. At this point, the manipulation signals inputted into the controller 100 according to quantities of manipulation of the acceleration pedals 70b and 70c are neglected, so that the manipulation signals are not outputted from the controller 100 to the outside.

As a result of determination in the foregoing function selection determining step S200, when the joystick travel function is released, the display releasing step S500 and the work performing step S600 are sequentially performed.

In the display releasing step S500, the controller 100 releases the selected joystick travel function state and the warning message which have been displayed on a display device 110, thereby informing the driver that the joystick travel function is released.

In the work performing step S600, the driver can manipulate the joysticks 70 and 70a to drive the boom and the arm, and can manipulate the acceleration pedals 70b and 70c to control the travel of the heavy equipment.

In the working performing step S600, the controller 100 outputs a control signal according to the manipulation signal of the arm joystick 70a to electronic proportional valves 90b and 90c for an arm cylinder, outputs a control signal according to the manipulation signal of the boom joystick 70 to electronic proportional valves 90 and 90a for a boom cylinder, and outputs control signals according to the manipulation signals of the acceleration pedals 70b and 70c to electronic proportional valves 90d, 90e, 90f and 90g for the traveling motors.

Figure 3:
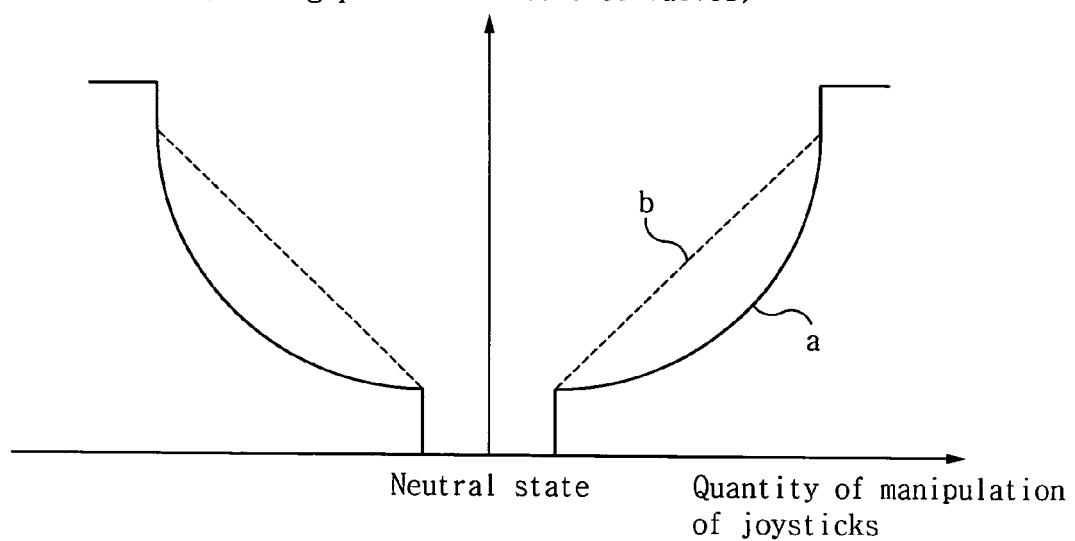
FIG. 3 is a graph showing a relation between a quantity of manipulation of joysticks and a secondary pressure of electronic proportional valves in accordance with the present invention.

A general characteristic of a secondary pressure of the electronic proportional valves is plotted by a dotted line 'b' on a graph of FIG. 3. The dotted line 'b' indicates the characteristic of the secondary pressure at which hydraulic fluid is linearly supplied to control valves 60b and 60c for the traveling motors according to the quantities of manipulation of the joysticks 70 and 70a.

However, a solid line 'a' on a graph of FIG. 3 corresponds to an example modified in such a way that, when the joystick travel function is selected, the secondary pressure characteristic of the electronic proportional valves is controlled in a parabolic form in order to improve precise manipulation capability and prevent impact on starting the travel. In addition, it is possible to have control in various graph forms.

For this long-distance travel, the driver manipulates the joysticks 70 and 70a to drive the left and right traveling motors 50 and 50a, thereby being capable of traveling the heavy equipment. Therefore, it is possible to give the driver convenience of manipulation.

As set forth above, the method for controlling the travel of the heavy equipment with the joystick in accordance with the present invention has advantages as follows:

The working unit such as the boom and the arm and the traveling unit can be selectively driven by using the electronic joystick. Thus, the driver can control the travel of the construction heavy equipment in a comfort sitting posture. In result, it is possible not only to increase convenience of manipulation, but also to maintain a correct driving posture during long-distance traveling. Thereby, it is possible to remarkably reduce a fatigue of the driver.

What is claimed is:

1. A method for controlling travel of construction heavy equipment with joysticks, in which the construction heavy equipment has boom and arm joysticks outputting first manipulation signals according to quantities of manipulation in order to drive a boom and an arm, left and right acceleration pedals outputting second manipulation signals according to quantities of manipulation in order to drive left and right traveling units, a plurality of control valves controlling hydraulic fluid supplied to each of the boom, the arm and the left and right traveling units, and a plurality of electronic proportional valves operated by control signals outputted from a controller to control each of the control valves, the method comprising the steps of:

inputting a joystick travel function selection signal, the first manipulation signals generated by the joysticks and the second manipulation signals generated by the acceleration pedals into the controller;

determining whether a joystick travel function is selected or released from the joystick travel function selection signal;

when the joystick travel function is selected, performing long-distance travel by preventing the control signal according to the second manipulation signals of the acceleration pedals from being outputted, by outputting the control signal according to the first manipulation signal of the arm joystick to the electronic proportional valves connected to the control valve for controlling the left traveling motor and by outputting the control signal according to the first manipulation signal of the boom joystick to the electronic proportional valves connected to the control valve for controlling the right traveling motor; and when the joystick travel function is released, performing a work by outputting the control signal according to the first manipulation signal of the arm joystick to the electronic proportional valves connected to the control valve for controlling an arm cylinder, by outputting the control signal according to the first manipulation signal of the boom joystick to the electronic proportional valves connected to the control valve for controlling an boom cylinder and by outputting the control signal according to the second manipulation signals of the acceleration pedals to the electronic proportional valves for the traveling motors.

2. The method as claimed in claim 1, wherein the construction heavy equipment is provided with a display device for displaying information of the construction heavy equipment to a driver, and further comprising the steps of: when the joystick travel function is selected, displaying a state of the selected travel function and a warning message on the display device; and when the joystick travel function is released, releasing the state of the selected travel function and the warning message from the display device.

3. The method as claimed in claim 1, wherein, in the step of performing the long-distance travel, a secondary pressure characteristic of the electronic proportional valves based on the manipulation quantities of the joysticks is controlled in a parabolic form in order to improve precise manipulation capability of the joysticks and to prevent impact from being generated on travel starting of the construction heavy equipment.

* * * * *